United States Patent
Steingruebner

(10) Patent No.: US 7,496,354 B2
(45) Date of Patent: Feb. 24, 2009

(54) TELEMATIC SERVICE PROCEDURE

(75) Inventor: Mihai Steingruebner, Jersey City, NJ (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 987 days.

(21) Appl. No.: 10/846,926

(22) Filed: May 17, 2004

(65) Prior Publication Data

US 2005/0255834 A1 Nov. 17, 2005

(51) Int. Cl.
*H04M 3/42* (2006.01)
*H04Q 7/30* (2006.01)

(52) U.S. Cl. .................. 455/414.1; 455/432.2; 455/445

(58) Field of Classification Search ............. 379/37–45, 379/93.23, 90, 93.05, 93.08, 100.17; 455/414.1, 455/432.2, 426.1, 445; 701/213, 301
See application file for complete search history.

(56) References Cited

U.S. PATENT DOCUMENTS

| 6,477,459 | B1* | 11/2002 | Wunderlich | 701/209 |
| 6,615,130 | B2* | 9/2003 | Myr | 701/117 |
| 7,215,965 | B2* | 5/2007 | Fournier et al. | 455/456.1 |
| 2004/0203730 | A1* | 10/2004 | Fraser et al. | 455/426.1 |
| 2004/0203970 | A1* | 10/2004 | Rooke et al. | 455/515 |

* cited by examiner

Primary Examiner—Melur Ramakrishnaiah
(74) Attorney, Agent, or Firm—Crowell & Moring LLP

(57) ABSTRACT

A telematic service procedure includes first establishing a connection with a voice call a service center, and then determining whether a digital or analog network status is to be used during the establishment of a connection.

8 Claims, 4 Drawing Sheets

Header Replacement

Telematic service procedure

| | | Digital with full SMS | Digital without MO / MT SMS (take 6 seconds) | Analog/AMPS |
|---|---|---|---|---|
| 0) | Initialization: | GATS Standard | If analog is available, telephone goes to analog mode with info to TCU that initialization (E65) If no analog, no initialization (because roaming) | with analog number; transmit GATS within MEMS |
| 1) | E-Call: | Digital voice call with DTMF for ANI + GATS Standard | Digital voice call with DTMF for ANI; retransmit via DTMF for location | with analog number; transmit GATS within MEMS |
| 2) | B-Call: (will be later replaced by Teleservices) | B-call uses E-Call GATS procedure with Appl. ID of B-CALL See above | B-call uses E-Call procedure with Appl. ID of B-CALL See above | B-call uses E-Call GATS procedure with Appl. ID of B-CALL See above |
| | Teleservices: | | | |
| | Manual B-Call | B-call uses E-Call GATS procedure with Appl. ID of B-CALL See above | B-call uses E-Call procedure with Appl. ID of B-CALL See above | B-call uses E-Call GATS procedure with Appl. ID of B-CALL See above |
| | Automatic Call | GATS Standard | Voice call | with analog number; transmit GATS within MEMS |
| | Hotline | GATS Standard | Voice call | with analog number; transmit GATS within MEMS |
| | Your BMW Center | GATS Standard | Voice call | with analog number; transmit GATS within MEMS |
| | Manual Service Call from Vehicle Menu | GATS Standard | Voice call | with analog number; transmit GATS within MEMS |
| 3) | RTTI: | + GATS Standard TMC point to point protocol | None | None |
| 4) | BMW Info: | + GATS BMW Standard | None | None |
| 5) | AKD (Concierge): | Digital voice call with DTMF for ANI first then Information Request Message (IRM) (see GATS Standard) | Digital voice call with DTMF for ANI first then IRM (see GATS Standard) No POI download possible | with analog number; transmit GATS within MEMS phone ignores dial request to the same no. |

Fig. 1

TELEMATIC SERVICE PROCEDURE

FIELD OF THE INVENTION

The present invention relates to a telematic service procedure.

BACKGROUND OF THE INVENTION

Telematic services can be used to provide voice and/or data communications for roadside assistance services, concierge services, traffic services, and emergency services.

Currently there is no telematic protocol in the United States for digital network transfers, because of the various network standards and different area coverage.

In Europe, telematic protocols based on SMS data carriers do not exist, because transfer of "SMS data" does not exist. If transfer by means of SMS data is not possible, services cannot be offered. Only in the case of emergency calls (e-calls) is a connection through the speech channel possible, but there is no transfer of important data such as location and vehicle identification number in the case of roadside assistance.

Except for an emergency call, call telematic services are started with the data transfer, and the voice connection is established subsequently. This type of connection is called call-request or information-request messages, in which the service provide is asked for a speech connection after data have been received from the vehicle in the case of roadside assistance.

Existing telematic protocols with SMS data can be used only under certain conditions or not at all in countries that do not have uniform coverage by a digital network standard. Digital Telematic protocols cannot be used in areas with analog networks standards, and the MEMS telematic protocol, which is used the United States, cannot be used for analog network transfers in digital networks.

SUMMARY OF THE INVENTION

The present invention is directed to a "call strategy," which may be an overall strategy for handling all types of transmissions via a wireless network connection. The wireless network connection can be used for may be voice connections as well as connections for data transmission. With this call strategy, regardless of the network standard, many telematic services (services) can be used, such as road side assistance services, concierge services, traffic services and emergency services.

The call strategy is independent of country-specific network conditions (network standards). This is achieved in that the call strategy supplies an overall concept for determining the available network conditions and determine how the network conditions can be utilized for the transmission of voice and/or data.

According to the invention, the network standards are first classified. In the U.S., for example, there are three classes of the network standards: Digital network with available data service (SMS Data Service), digital network without data service (without MO/MT SMS Data Service), and analog network.

After the classification of the network standards, what transmission protocol is available for each calling service is determined for each classification of network standards. Regardless of the classification of network standards, a connection is always established with a voice call in the direction of the service center. Since the establishment of a voice call is possible with all protocols, this ensures the basic condition for a connection.

According to the invention, the telephone or also further on called Telematic control unit (TCU) analyzes the classes of network standards and determine whether a digital or analog network status is to be used during the following establishment of a connection. In the case of a digital network, the telephone differentiates between two possibilities: digital network with available data service or digital network without data service.

In the case of a digital network with available data services, the standard transmission is implemented for all call services, independent of network standards.

If the inquiry of the telephone to the digital network is answered negatively, the telephone cannot use data services, and a data transmission request to the telephone takes place via the voice channel if the service was started with a voice connection first. In this case, the change from the parallel standard data transmission to the data transmission in the voice channel is significant. The transmission can then take place, for example, in the U.S. by means of DTMF. This process makes it possible that the data of the entire dataset for maintaining the service can be transmitted.

In the case of an analog network status, the telephone starts with the transmission (modem connection) by the telematic protocol MEMS. The invention is characterized here in that the telematic protocol MEMS is used for the transmission of SMS data.

One of the advantages of the invention is that it ensures that a transmission of data and the connection per voice to the operator of the service center exists at any time for telematic services, such as roadside assistance services, concierge services, traffic services, and particularly for emergency services.

Another advantage of the invention is that, with the call strategy, telematic services, particularly emergency services, can be used independently of network conditions, such as network standard and global distribution of networks.

In addition, as a result of the call strategy according to the invention, the telematic services are available independently of different digital network standards, such as GSM, CDMA or TDMA.

BRIEF DESCRIPTION OF THE DRAWINGS

FIG. 1 describes three classes of network standards.

DESCRIPTION OF PREFERRED EMBODIMENTS

Figure 2A:
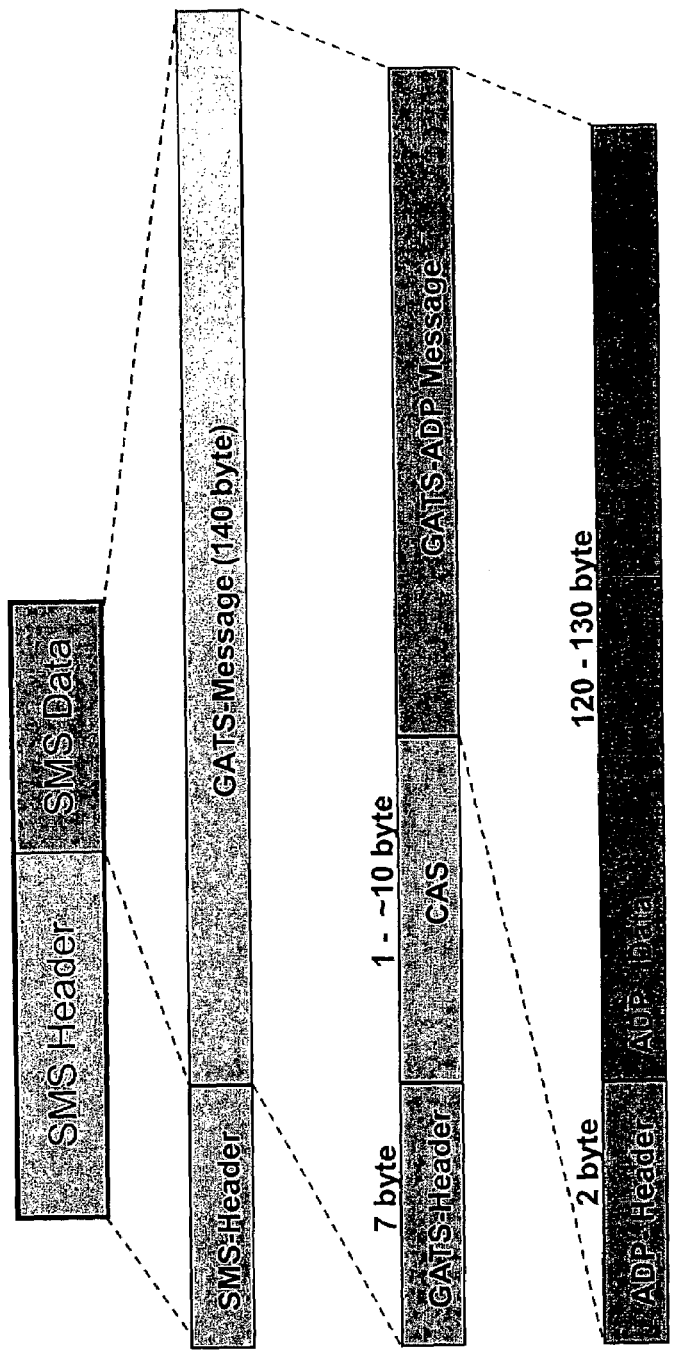
FIG. 2a illustrates the digital data structure for data transmission by way of Data SMS Services.

The present invention is directed to a "call strategy." In the present invention, a call strategy may be an overall strategy for handling all types of transmissions via a wireless network connection. The wireless network connection can be used for voice connections as well as connections for the transmission of data. With this call strategy, regardless of the network standard, telematic services (services) can be used, such as road side assistance services, concierge services, traffic services and emergency services.

According to the invention, the call strategy is developed such that independence with respect to country-specific network conditions (network standards) is ensured. This is achieved in that the call strategy supplies an overall concept for determining the available network conditions and defines the handling as to how the network conditions can be utilized for the transmission of voice and/or data. Within the scope of the overall concept, a classification is first carried out of the network standards existing in the individual case.

By means of an embodiment, a classification in three classes for the U.S. will be explained in detail below. In FIG. 1, the three classes are explained in detail by means of a table. This table contains conceivable network standards with respect to the possible calling services. According to the call strategy, in this case, the following three classes are discussed which correspond to the network standards in the U.S.: Digital network with available data service (SMS Data Service), digital network without data service (without MO/MT SMS Data Service) and analog network.

After the classification of the network standards has taken place, within the scope of the overall concept, it is assigned to the call strategy of each class which transmission protocol is available for which calling service. This assignment is illustrated for the embodiment in the table of FIG. 1.

In this case, it is an important characteristic of the call strategy according to the invention that, independently of the classification which has to take place, a connection is always established with a voice call in the direction of the service center. Since the establishment of a voice call is possible with all protocols, this ensures the basic condition for a connection. This establishment of a voice call takes place irrespective of in which class of the classes defined for the respective application the telephone is situated or which network conditions exist.

According to the invention, the telephone analyzes the classes, in which case, a differentiation is first made of whether a digital or analog network status is to be used during the following establishment of a connection.

In the case of a digital network status, the TCU starts with the telematic protocol sequence which is known for the digital transmission with Data SMS Services. A characteristic of the invention is that the TCU makes an inquiry concerning the network standards to the network (network acknowledge) and, by means of the analyzed response of its inquiry, the telephone can detect whether or not SMS services are available for the transmission. The telephone therefore differentiates between the two digital possibilities listed in the table: Digital network with available data service (SMS Data Service) or digital network without data service (without MO/MT SMS Data Service).

If the conditions of a digital network with available data SMS Services are met, as indicated in the table in FIG. 1, in the case of all call services, the standard transmission is implemented according to the Telematic transmission protocol, such as the Global Automotive Telematics Standard (GATS) protocol. In FIG. 2a, the digital data structure is illustrated which is necessary for the transmission of GATS data by way of Data SMS Services: In this case, the GATS messages of a length of 140 bytes are considered to be SMS data and are provided with an SMS header, so that they can be transmitted in the SMS Service.

Figure 3:
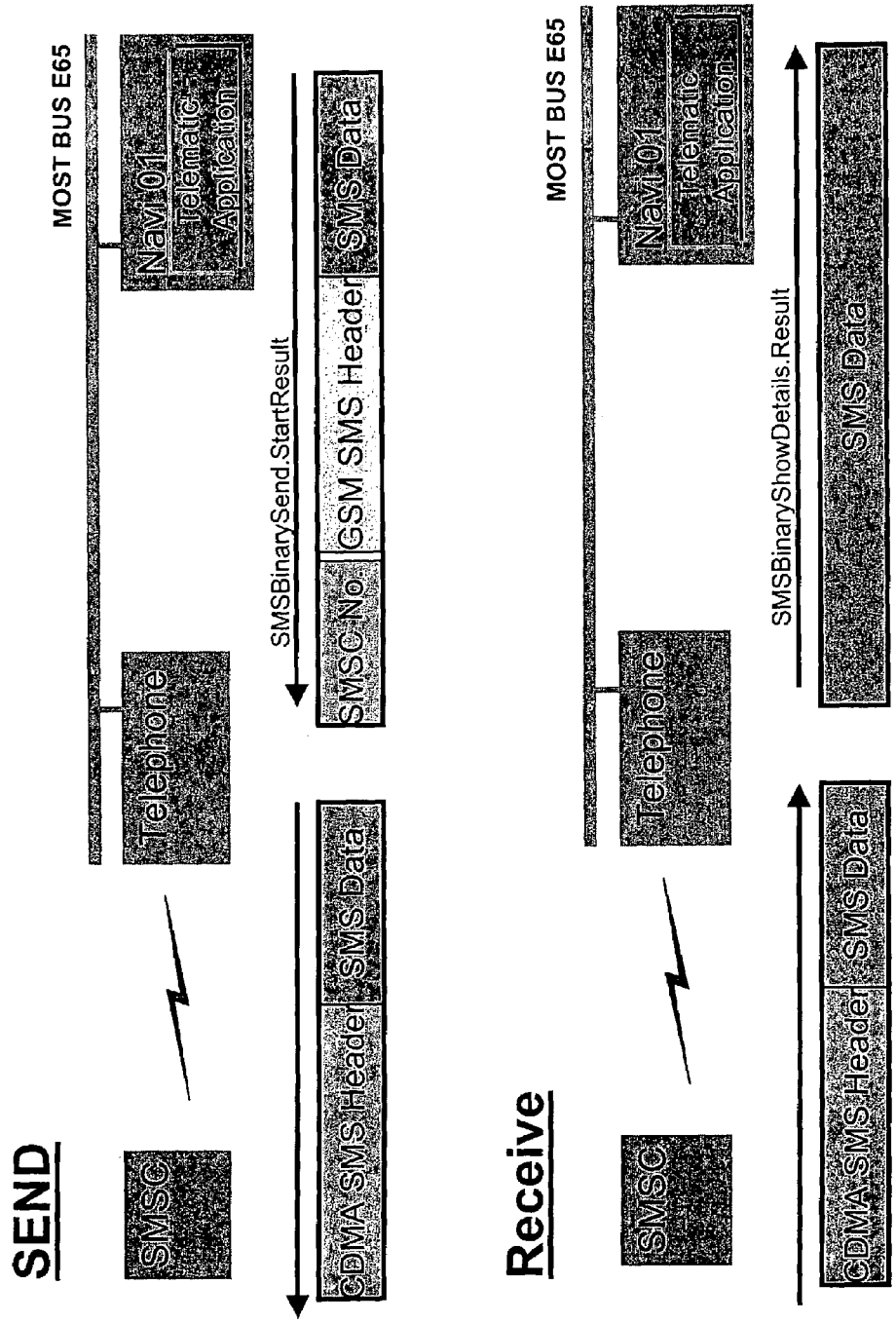
FIG. 3 illustrates the process of header adaptation to a given network standard when the transmission takes place in a network with SMS Data Services.

Another important characteristic of the invention is that, when the transmission takes place in the network with SMS Data Services, independence is achieved for different network standards, such as GSM, CDMA or TDMA. As a result, it becomes possible that the telephone interprets the parameters of a GSM SMS header and transfers them into the respectively required SMS header network standard. By means of a drawing, the process of this header adaptation to the given network standard is illustrated (see FIG. 3). During the send operation of the telephone, the SMS message, which includes the SMS data and the SMS header, which includes the SMSC number and the GSM SMS header, is adapted to the given network standard. If, for example, a CDMA network standard is given, the SMS header of the SMS message is replaced by a CDMA SMS header or, in the case of a given GSM network standard, the SMS header of the SMS message is replaced by a GSM SMS header. When receiving from different network standards, such as GSM, CDMA or TDMA, the telephone recognizes the respective SMS header network standard (for example, CDMA SMS header or GSM SMS header). In addition, the telephone recognizes SMS as a data SMS and can therefore read the data SMS and can handle the entire data message according to the Telematic protocol header.

If the inquiry of the telephone to the network is answered negatively in the digital network (negative acknowledge), the telephone cannot use the SMS Data Service. In this case, the invention is characterized in that, after the expiration of a timer on the service center side, a data transmission request takes place to the telephone by way of the voice channel if the service was started with a voice connection first. The timer is started on the service center side with the reception of the voice connection. Since, as illustrated above, the establishment of a connection always takes place by means of a voice call in the direction of the service center, as a result, the timer on the service center side is also always started. If the service was started with a data connection first, the TCU starts a timer for receiving a data SMS acknowledge. If the timer times out the TCU will start a voice call by itself and establish then the data connection via voice channel automatically. In this case, the change from the parallel standard data transmission to the data transmission in the voice channel is significant. The transmission can then take place, for example, in the U.S. by means of DTMF. This process makes it possible that the data (vital data) of the entire dataset for maintaining the service can be transmitted.

Figure 2B:
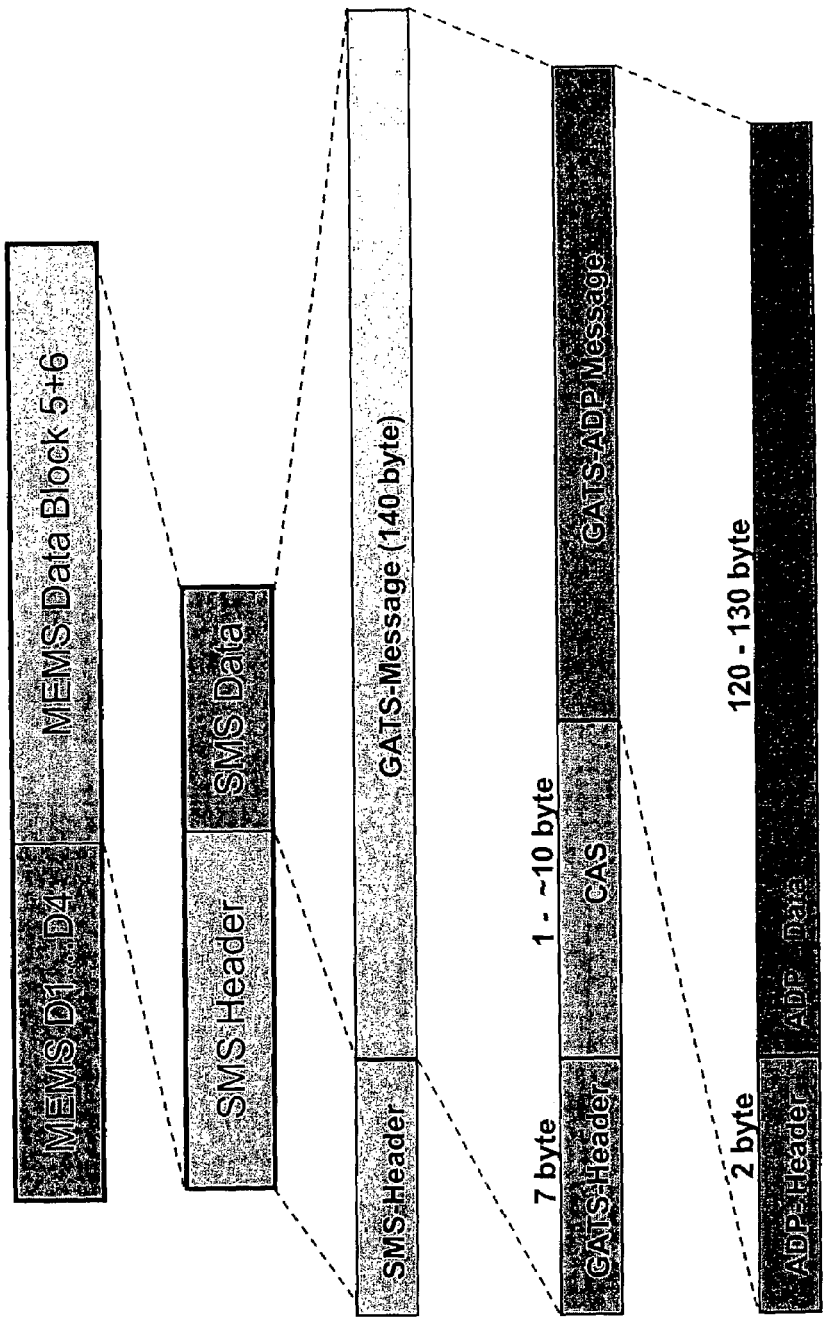
FIG. 2b illustrates the digital data structure for data transmission by way of an analog network status.

In the case of an analog network status, the telephone starts with the transmission (modem connection) by the telematic protocol MEMS. The digital data structure used here is shown by means of a drawing in FIG. 2b. The invention is characterized here in that the telematic protocol MEMS is used for the transmission of SMS data. The data SMS is transmitted in this case as data in the data block (D5+D6) of the MEMS protocol.

As the result of the illustrated call strategy, it is therefore ensured that a transmission of data and the connection per voice to the operator of the service center exists at any time for telematic services, such as roadside assistance services, concierge services, traffic services, and particularly for emergency services. Thus, in an emergency, the suggested call strategy permits, in the case of an existing network, the transmission of possibly vital data (such as the location data or the identification number).

The invention claimed is:
1. A telematic service procedure, comprising the acts of:
   establishing a connection with a voice call to a service center;
   determining in a telematics control unit whether a digital or analog network is to be used during the establishment of a connection for transfer of data to the service center;
   classifying in the telematics control unit available network standards;
   determining, based on the digital or analog network status and the classified available network standards, a transmission protocol to be used for data transfer; and
   transmitting data using the determined transmission protocol on the determined network.

2. The telematic service procedure of claim 1, wherein the available network standards include a digital network with available data service, a digital network without data service, and an analog network.

3. The telematic service procedure of claim 2, wherein when the determined network is a digital network, first using a telematic protocol sequence for a digital network with available data service.

4. The telematic service procedure of claim 3, further comprising the act of:
    making an inquiry to the digital network to identify the available network standards.

5. The telematic service procedure of claim 4, further comprising the act of:
    analyzing a response from the digital network to the inquiry, and
    determining whether data service is available.

6. The telematic service procedure of claim 5, further comprising the act of:
    in the case of a digital network with available data service, implementing standard transmission according to the Global Automotive Telematics Standard protocol.

7. The telematic service procedure of claim 5, further comprising the act of:
    in the case of a digital network without data service, after expiration of a predetermined time period, making a data transmission request from the service center over the voice call,
    wherein the predetermined time period is started when the service center receives the voice call.

8. The telematic service procedure of claim 5, further comprising the act of:
    in the case of an analog network, starting a data transmission to the service center via a modem connection over the voice call using the MEMS telematic protocol.

* * * * *